United States Patent
Houston

(12) 
(10) Patent No.: US 8,319,484 B2
(45) Date of Patent: Nov. 27, 2012

(54) VOLTAGE REGULATOR SYSTEM AND METHOD FOR EFFICIENCY OPTIMIZATION USING DUTY CYCLE MEASUREMENTS

(75) Inventor: Michael Jason Houston, Cary, NC (US)

(73) Assignee: Intersil Americas Inc., Malpitas, CA (US)

( * ) Notice: Subject to any disclaimer, the term of this patent is extended or adjusted under 35 U.S.C. 154(b) by 813 days.

(21) Appl. No.: 12/334,440

(22) Filed: Dec. 12, 2008

(65) Prior Publication Data

US 2009/0179619 A1 Jul. 16, 2009

Related U.S. Application Data

(60) Provisional application No. 61/007,577, filed on Dec. 12, 2007.

(51) Int. Cl.
*G05F 1/00* (2006.01)
(52) U.S. Cl. ............ 323/272; 323/283; 323/285
(58) Field of Classification Search .................. 323/272, 323/284, 285, 283
See application file for complete search history.

(56) References Cited

U.S. PATENT DOCUMENTS

| | | | |
|---|---|---|---|
| 6,683,494 B2* | 1/2004 | Stanley | 330/10 |
| 7,180,274 B2* | 2/2007 | Chen et al. | 323/222 |
| 7,265,522 B2* | 9/2007 | Sutardja et al. | 323/222 |
| 7,492,134 B2* | 2/2009 | Tang et al. | 323/241 |
| 7,573,249 B2* | 8/2009 | Sutardja et al. | 323/283 |
| 7,719,324 B1* | 5/2010 | Snowdon et al. | 327/108 |
| 2006/0038543 A1* | 2/2006 | Hazucha et al. | 323/282 |
| 2008/0129260 A1* | 6/2008 | Abu Qahouq et al. | 323/272 |
| 2008/0278123 A1 | 11/2008 | Mehas et al. | |

* cited by examiner

*Primary Examiner* — Gary L Laxton
*Assistant Examiner* — Zekre Tsehaye
(74) *Attorney, Agent, or Firm* — Graybeal Jackson, LLP

(57) ABSTRACT

A method and system control the adding or dropping of phases in a multiphase voltage regulator. The regulator has an efficiency and this efficiency of the regulator is calculated for a given number of phases being activated from an output voltage, input voltage, output current, and duty cycle of the regulator. The efficiency of the regulator is also calculated if a phase is added using the derivative of the duty cycle as a function of the output current. The efficiency of the regulator is further calculated if a phase is dropped using the derivative of the duty cycle as a function of the output current. From these operations of calculating, a phase is either added, dropped, or the phase is maintained at its current value to thereby optimize the efficiency of the regulator.

20 Claims, 7 Drawing Sheets

VOLTAGE REGULATOR SYSTEM AND METHOD FOR EFFICIENCY OPTIMIZATION USING DUTY CYCLE MEASUREMENTS

PRIORITY CLAIM

The present application claims the benefit of U.S. Provisional Patent Application Ser. No. 61/007,577, entitled VOLTAGE REGULATOR SYSTEM AND METHOD FOR EFFICIENCY OPTIMIZATION USING DUTY CYCLE MEASUREMENTS, filed Dec. 12, 2007, which application is incorporated herein by reference in its entirety.

TECHNICAL FIELD

Embodiments of the present invention relate generally to voltage regulators and more specifically to efficiency optimization in multiphase voltage regulators.

BACKGROUND

Switching voltage regulators are commonly utilized in electronic systems to generate from a received input voltage and current a required output voltage and current for operating components in the electronic system. In operation, a switching voltage regulator turns power transistors, which are typically MOSFETs, ON and OFF rapidly in order to generate the desired output voltage and current. An internal control circuit provides pulse width modulated (PWM) signals to the power transistors to control the ON and OFF state of the transistors. The duration for which a PWM signal is ON divided by the period of the PWM signal defines a duty cycle D of the PWM signal. The internal controller adjusts the duty cycle D of the applied PWM signals to thereby control and regulate output voltage and current. Numerous different types of circuit topologies are utilized for such switching voltage regulators, with the specific type of topology being determined by the application of the switching voltage regulator. For example, the switching voltage regulator may be a step-down converter in which case a Buck converter may be utilized while in other applications a step-up converter such as a Buck-boost converter may be utilized. The Buck converter will be utilized in the following description merely by way of example. The terms "converter" and "voltage regulator" are used interchangeably herein.

Many applications utilize multiphase Buck converters in which a number of individual Buck converters are connected in parallel to a load that is to receive the generated output voltage and current. In such a multiphase Buck converter, each individual Buck converter will be referred to as a stage or phase. The internal control circuit of a multiphase Buck converter generates phase shifted PWM signals to activate the parallel-connected Buck converter stages so that each stage supplies a portion of the overall output power defined by the output voltage and current. Furthermore, the internal control circuit may turn stages ON and OFF depending upon the voltage and current demands of the load connected to the multiphase converter. For example, if the load draws more current from the multiphase converter the internal control circuit may activate more stages while the control circuit may deactivate stages when the load draws less current.

The efficiency of multiphase voltage regulators varies as a function of the number of stages or phases that are activated and as a function of the required load or output current IOUT. The efficiency q of a multiphase converter is defined as input power PIN supplied to the converter divided into the output power POUT supplied by the converter ($\eta$=(POUT/PIN). The input power PIN is given by input current IIN times input voltage VIN while output power POUT is given by output current times IOUT times output voltage VOUT. Users of multiphase voltage regulators would like the internal control circuit to detect IIN, VIN, IOUT, and VOUT so that the efficiency q of the regulator can be calculated in real time and operation of the regulator controlled in response to the detected efficiency to thereby improve the overall efficiency of the regulator.

FIG. 1 is a graph illustrating efficiency $\eta$ as a function of output current IOUT for a four-stage or four-phase voltage regulator. A first line 100 shows the efficiency of the regulator for a single phase, meaning that one of the four stages in the multiphase converter is activated. A line 102 in the graph illustrates the efficiency of the converter for two phases, a line 104 shows the efficiency for three phases, and a line 106 illustrates the efficiency for four phases. As seen from the graph, the efficiency $\eta$ of the converter varies as a function of the output current IOUT and as a function of the number of phases activated. Moreover, for a given output current IOUT the efficiency $\eta$ of the regulator can be improved by controlling the number of phases that are activated. For example, if the output current IOUT is 75 amps then activating three phases optimizes the efficiency $\eta$ while two phases optimize efficiency when the output current equals 30 amps. Ideally, the phases of the multiphased voltage regulator would be controlled so that the efficiency $\eta$ of the regulator is as shown through the bold line in FIG. 2. FIG. 2 is a graph illustrating efficiency $\eta$ as a function of output current IOUT and includes a bold line 200 corresponding to the portions of the respective lines 100-106 in FIG. 1 that would ideally be tracked by the converter during operation in order to optimize the overall efficiency of the converter.

In conventional approaches for optimizing efficiency of a multiphased voltage regulator, current thresholds are utilized to determine whether to activate or deactivate phases during operation. For example, referring back to FIG. 1 a first current threshold may be set at approximately 22 amps such that when the output current IOUT exceeds this threshold an additional phase is activated. In this case, the regulator operates with a single phase for output currents IOUT up to 22 amps and then once the output current exceeds 22 amps the internal control circuit activates a second phase so that the regulator now operates with two phases. In the example of FIG. 1, a second current threshold may be set at approximately 37 amps so that once the output current IOUT exceeds 37 amps the internal control circuit activates another phase so that the regulator now operates with three phases. A final current threshold may be set at approximately 53 amps so that when the output current IOUT exceeds this threshold the internal control circuit activates the fourth and final phase of the regulator so that the regulator now operates with four phases.

With this conventional approach, current thresholds cannot always be set so that the efficiency $\eta$ of the regulator is optimized over the entire range of output currents IOUT. For example, referring back to FIG. 1 a circle 108 is drawn around lines 102 and 104 at an output current IOUT of approximately 30 amps. Note that if a current threshold was set at 30 amps so that the regulator would switch at this point from two-phase operation to three-phase operation the efficiency of the regulator would not be optimal as shown in the graph by the efficiency for two-phase operation corresponding to line 102 being greater than the efficiency for three-phase operation corresponding to the line 104.

Improved systems and methods for the control of multiphase regulators to improve the efficiency of operation of such regulators are desirable.

SUMMARY

According to one embodiment of the present invention, a method and system control the adding or dropping of phases in a multiphase voltage regulator. The regulator has an efficiency and the efficiency of the regulator is calculated for a given number of phases being activated from an output voltage, input voltage, output current, and duty cycle of the regulator. The efficiency of the regulator is also calculated if a phase is added using the derivative of the duty cycle. The efficiency of the regulator is further calculated if a phase is dropped using the derivative the duty cycle. From these operations of calculating, a phase is either added, dropped, or the phase is maintained at its current value to thereby optimize the efficiency of the regulator.

DETAILED DESCRIPTION

Figure 1:
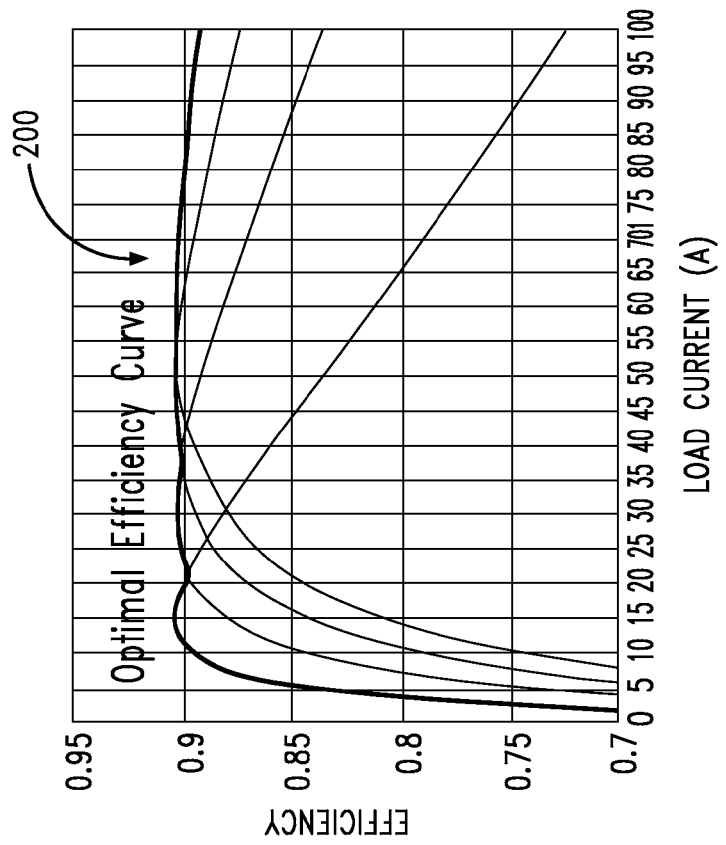
FIG. 1 is a graph illustrating the efficiency of a conventional multiphase regulator as a function of the output current of the regulator.
Figure 2:
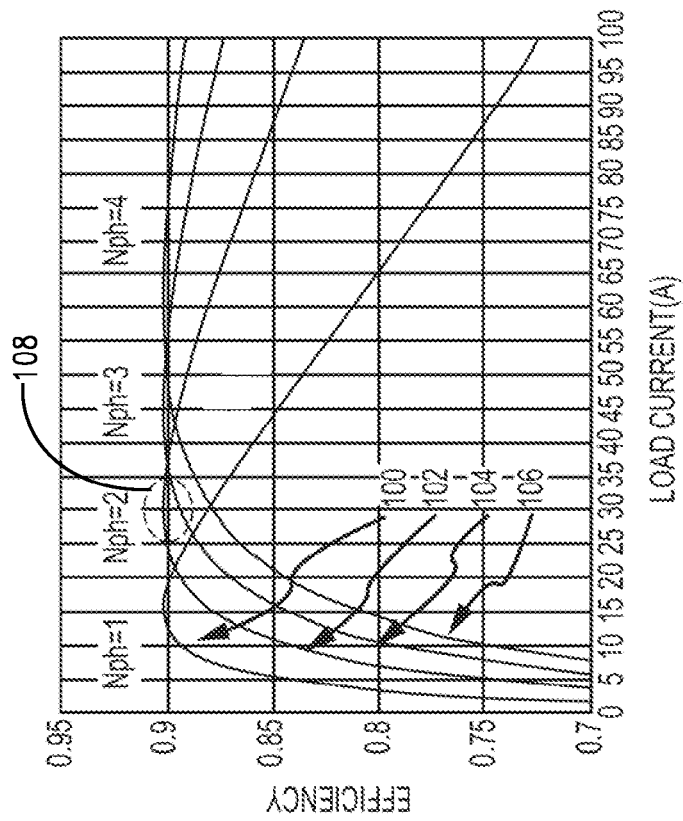
FIG. 2 is a graph illustrating the optimal efficiency for the multiphase regulator of FIG. 1.
Figure 3:
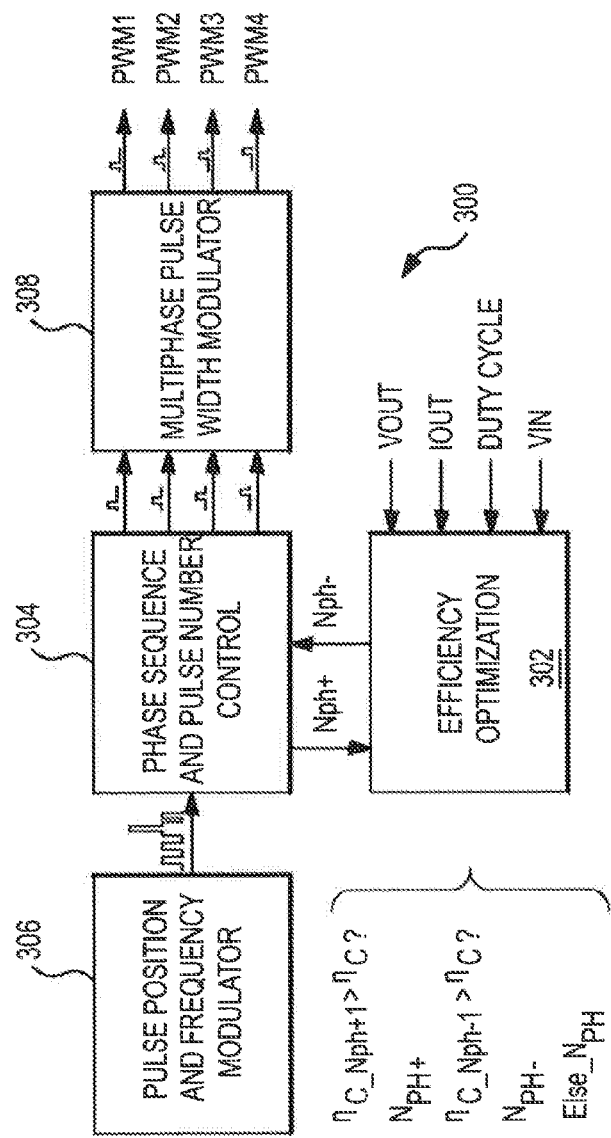
FIG. 3 is a functional block diagram of an internal control circuit including efficiency optimization circuitry for determining whether to add or drop phases in a multiphase voltage converter to thereby optimize efficiency of the converter according to one embodiment of the present invention.

FIG. 3 is a functional block diagram of an internal control circuit 300 according to one embodiment of the present invention. The internal control circuit includes efficiency optimization circuitry 302 for determining whether to add or drop phases in a multiphase voltage regulator to thereby optimize efficiency q of the regulator. More specifically, the efficiency optimization circuitry 302 utilizes input voltage VIN, output voltage VOUT, output current IOUT, and duty cycle D to generate a first phase signal NPH+ that increases the current number of phases currently activated by one and a second phase signal NPH− that decreases the current number of phases currently activated by one, as will be described in more detail below. With this approach, the efficiency η is optimized since the number of phases activated more accurately reflects the number of phases that should be active and eliminates or reduces the occurrence of the wrong number of phases being active that occurs when thresholds for the output current IOUT are utilized to improve efficiency. Note that as used herein the term "optimized" does not mean that the efficiency η of the voltage regulator being controlled is at its theoretical maximum or cannot be improved, but instead is intended to convey that the internal control circuit 300 improves the overall efficiency of the associated voltage regulator being controlled relative to other methods of improving efficiency, such as the use of current thresholds for the output current IOUT as previously discussed.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

Note that as mentioned above the efficiency optimization circuitry 302 utilizes VIN, VOUT, IOUT, and duty cycle D in controlling the numbers of phases or stages that are activated to thereby control the efficiency η of the multi-stage voltage regulator (not shown in FIG. 3) being controlled. The efficiency optimization circuitry 302 uses the duty cycle D instead of input current IIN because detecting the input current IIN is more difficult. This is true at least in part because input current IIN is not a DC current but is instead a pulsed current that is a function of the applied PWM signals. While sense resistors in series with a power transistor of the regulator through which the input current flows or sensing a DC resistance across a semiconductor coupled in series with this power transistor can be utilized to sense input current, these increase the cost of the voltage regulator and undesirably add components to the regulator, as will be appreciated by those skilled in the art. These methods require the conversion of a sensed voltage to the corresponding input current IIN and thus complicate the internal control circuitry and also may require additional components like the sense resistor, increasing the cost and complexity of the control circuitry and thereby the regulator. Instead of measuring input current IIN and then utilizing the value of this measured current in determining efficiency q, the duty cycle D of the regulator can be used to estimate efficiency, as is described in United States Publication No. 20080278123 A1, published Nov. 13, 2008, also owned by the assignee of the present application and which is incorporated herein by reference. Briefly, it can be shown that the input current is equal to Iin=(Ton×ILavg)/Ttot) for certain topologies of voltage converters, where the parameters Ton, Ttot relate to the duty cycle D and these parameters along with ILavg can be sensed or determined in a variety of different ways. The theory of operation behind using the duty cycle D in estimating the input current will not be discussed in detail herein, but is discussed in more detail in the above incorporated application.

The theory of operation of the efficiency optimization circuitry 302 will now be described in more detail. As indicated in FIG. 3, in operation the efficiency optimization circuitry 302 determines whether $\eta_{C\_Nph+1} > \eta_C$ and if so then the circuitry adds a phase $N_{PH}+$ to improve efficiency of the converter including the circuitry. In this equation, $\eta_C$ is the calculated efficiency of the multiphase converter at the current phase $N_{PH}$ while $\eta_{C\_Nph+1}$ is the calculated efficiency of the converter when a phase is added, which is designated $N_{PH}+$. The efficiency optimization circuitry 302 also determines whether $\eta_{C\_Nph-1} > \eta_C$ and if so then the circuitry drops a phase $N_{PH}-$ to improve efficiency of the converter. In this equation, $\eta_{C\_Nph-1}$ is the calculated efficiency of the converter when a phase is dropped, which is designated $N_{PH}-$. Finally, if the efficiency optimization circuitry 302 determines that neither $\eta_{C\_Nph+1} > \eta_C$ nor $\eta_{C\_Nph-1} > \eta_C$ then the circuitry maintains the phase $N_{PH}$ of the converter including the circuitry, meaning the phase remains the same and the optimization circuitry 302 circuitry neither drops nor adds a phase.

In operation, the efficiency optimization circuitry 302 develops the first phase signal NPH+ when the number of phases is to be incremented by one and activates the second phase signal NPH− when the number of phases is to be decremented by one. The signals NPH+ and NPH− are applied to a phase sequence and pulse number control circuit 304 that operates in combination with a pulse position and frequency modulator 306 and multiphase pulse width modulator 308 to control the stages or phase of the multiphase regulator, which in this case includes four stages controlled by the signals PWM1-PWM4 from the multiphase pulse width modulator.

Figure 4:
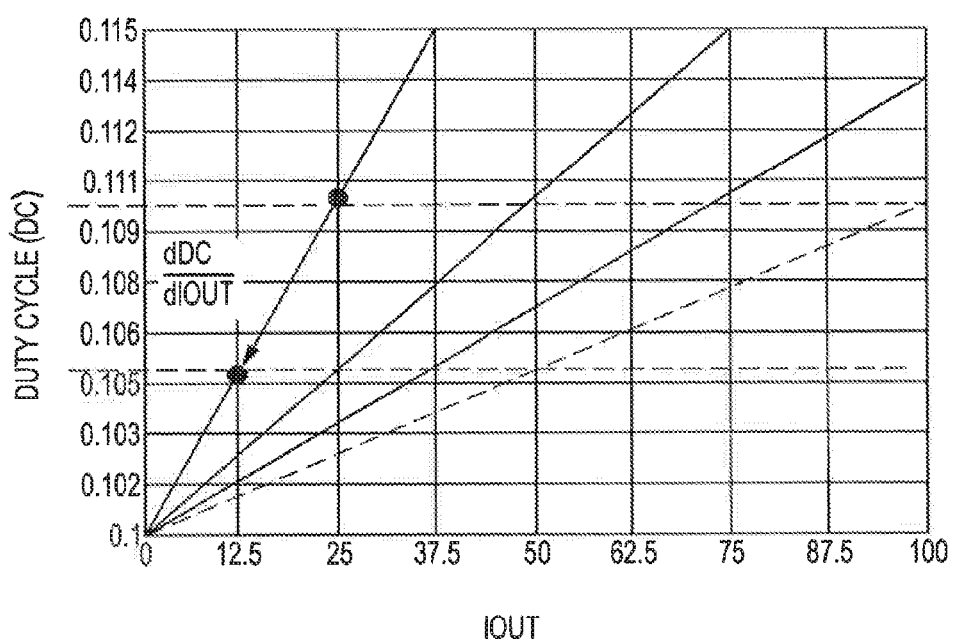
FIG. 4 is a graph of the duty cycle DC of a multiphase converter including the internal control circuit as a function of output current.

FIG. 4 is a graph illustrating the duty cycle DC of a multiphase converter including the internal control circuit 300 as a function of output current IOUT. Note that in the present description the duty cycle may alternately be designated as either "DC" or "D", as previously mentioned. The efficiency optimization circuitry 302 assumes that variations in the duty cycle DC are linear over a small region of operation of the multiphase converter. FIG. 4 shows that this is a reasonable assumption, as the curves in the figure illustrate, for example, when the output current IOUT varies between 12.5 and 25 amps. This assumption enables the efficiency optimization circuitry 302 to determine whether a phase should be added or dropped to increase the efficiency of the multiphase converter, as will be explained in more detail below. This is true because once the efficiency optimization circuitry 302 calculates efficiency $\eta_C$ of the converter at a given phase $N_{PH}$, the circuitry utilizes this linearity to calculate a new duty cycle DC at a new load and then utilizes this new duty cycle to determine whether the efficiency of the converter will increase or decrease if a phase is added or dropped. In other words, the efficiency optimization circuitry 302 calculates the new efficiency $\eta_{C\_Nph+1}$ using the new duty cycle and then compares this new efficiency to the current efficiency $\eta_C$ to determine whether to adjust the number of active phases.

Figure 5:
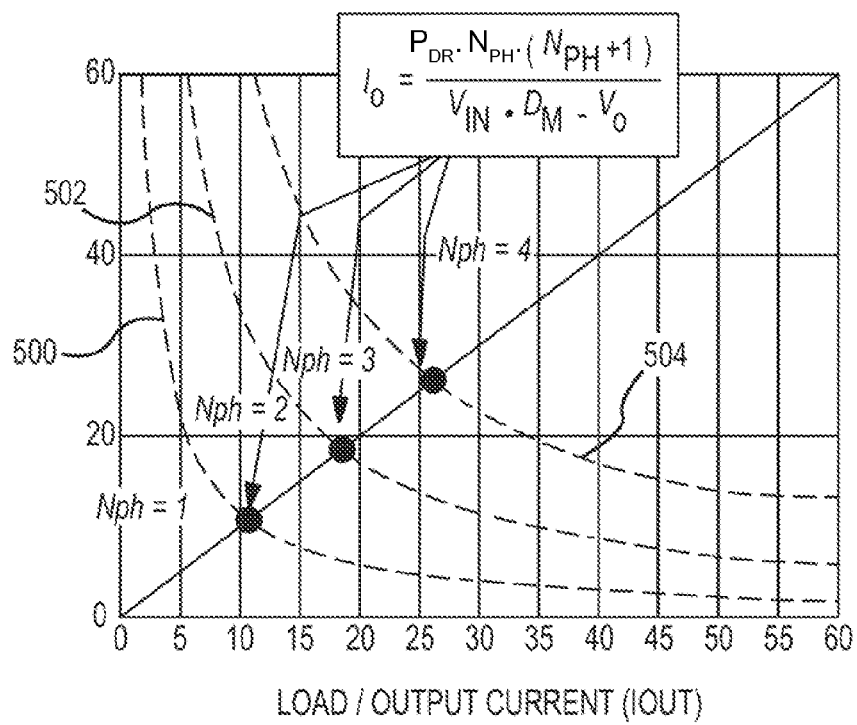
FIG. 5 is a graph illustrating a simplified calculation that is utilized by the efficiency optimization circuitry of FIG. 3 in determining whether to add or drop a phase according to one embodiment of the present invention.

FIG. 5 is graph illustrating a simplified calculation that is utilized by the efficiency optimization circuitry 302 of FIG. 3 in determining whether to add or drop a phase according to one embodiment of the present invention. In this embodiment, a dynamic current threshold for the output current IOUT, which is designated $I_O$ in the equation of FIG. 5, is utilized to compute thresholds for the output current upon which decisions about whether to add or drop a phase can be based. More specifically, the thresholds $I_O$ for the output current IOUT are given by the following equation[PFR1]:

$$I_o = \frac{P_{DR} \cdot N_{PH} \cdot (N_{PH} + 1)}{V_{IN} \cdot D_M - V_o}$$

where $N_{PH}$ indicates the current number of active phases of the multiphase regulator, $V_{IN}$ is the input voltage to the regulator, $D_M$ is the measured duty cycle of regulator, $V_O$ is the output voltage of the regulator, and $P_{DR}$ is a programmable variable that represents power losses such as gate drive losses that result from components in the regulator during operation. In operation, the efficiency optimization circuitry 302 solves the above equation for the current $I_O$ for the various values of $N_{PH}$ (1, 2, or 3 in the example of FIG. 5). The circuitry 302 then compares the measured value for the output current $I_{OUT}$ to the thresholds $I_O$ from the equation above. The circuitry 302 then uses results of these comparisons of the measured output current IOUT to the thresholds $I_O$ to determine whether to add or drop a phase, as will be described in more detail below.

Figure 6:
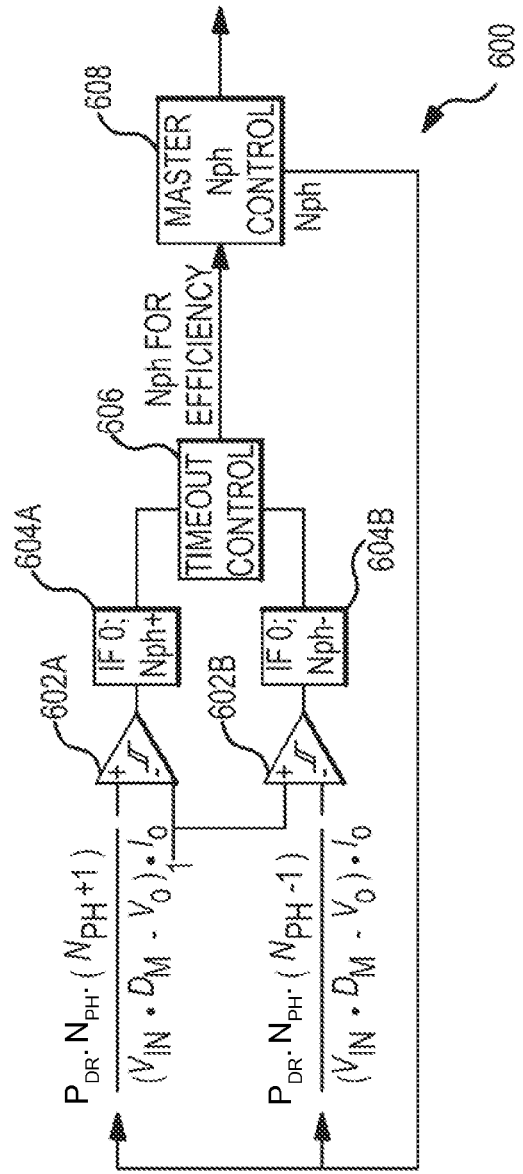
FIG. 6 is a functional block diagram of circuitry for implementing these calculated thresholds of FIG. 5 to determine whether to add or drop a phase.
Figure 7:
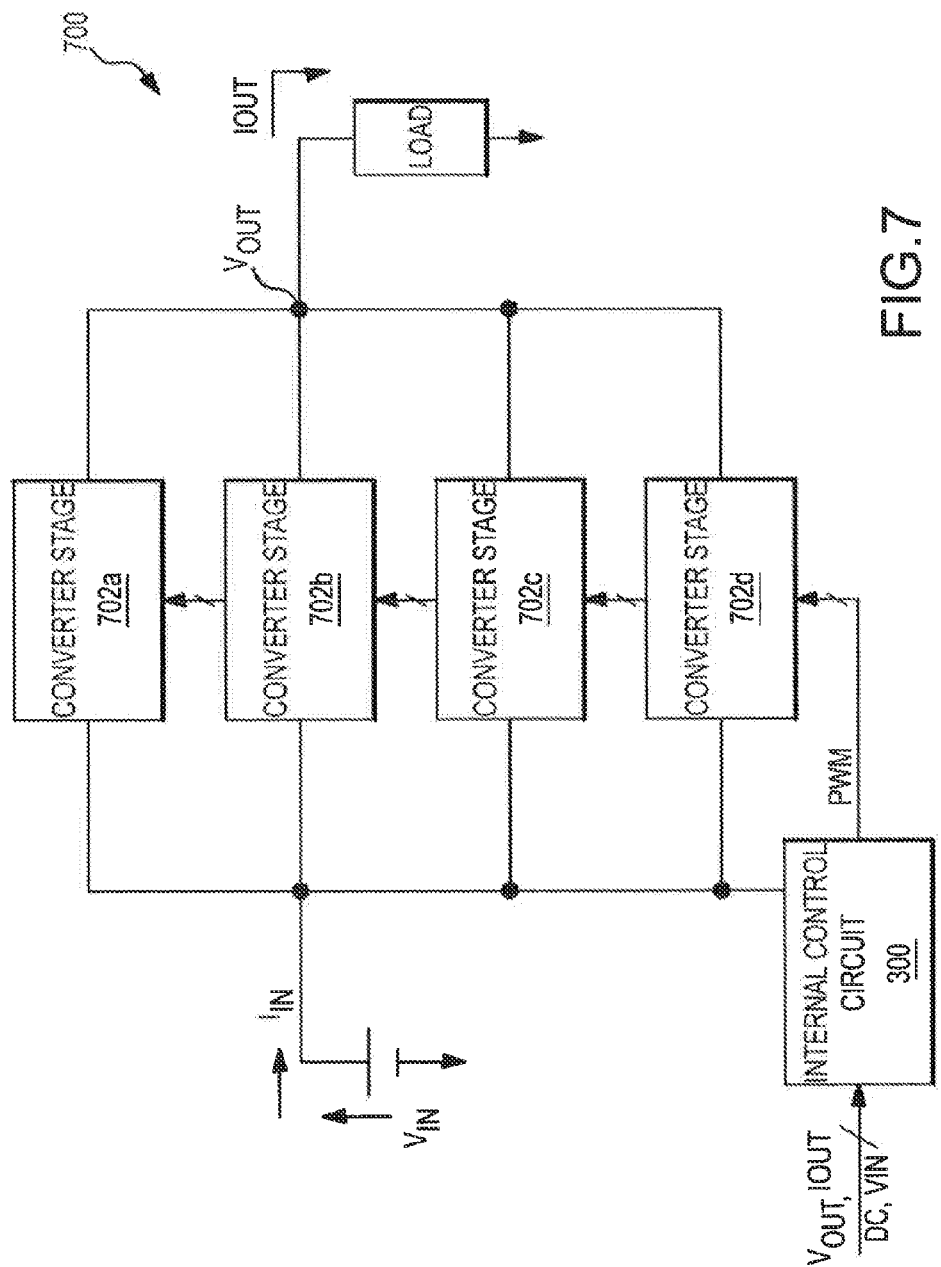
FIG. 7 is a functional block diagram of a multiphase converter including the internal control circuit of FIG. 3 according to one embodiment of the present invention.

FIG. 6 is a functional block diagram of circuitry 600 for implementing these calculated thresholds to determine whether to add or drop a phase. In this example, comparators 602a, 602b determine whether respective current output thresholds have been reached and if so generate a corresponding output that causes a phase to be dropped or added, respectively. For the comparator 602a, when the illustrated formula is equal to 1 this means that the output current IOUT has reached the associated threshold. In this situation, the comparator 602a generates a logical 1 on its output which, in turn, is applied through the illustrated control blocks to decrement the phase or drop a phase. Similarly, for the comparator 602b when the illustrated formula is equal to 1 this means that the output current IOUT has reached the associated threshold. In this situation, the comparator 602b generates a logical 1 on its output which, in turn, is applied through the illustrated control blocks to increment the phase or add a phase. FIG. 7 is a graph illustrating the result of the comparisons as a function of load current and illustrates the threshold values for the output current IOUT at which phases are added or dropped in the circuitry 600 of FIG. 6.

FIG. 7 is a functional block diagram of a multiphase voltage converter 700 including the internal control circuit 300 of FIG. 3 according to one embodiment of the present invention. In the example embodiment of FIG. 7, the converter 700 includes four stages 702a-d that the internal control circuit 300 controls responsive to the measured parameters VOUT, IOUT, DC and VIN to optimize the efficiency of the converter 700.

Figure 8:
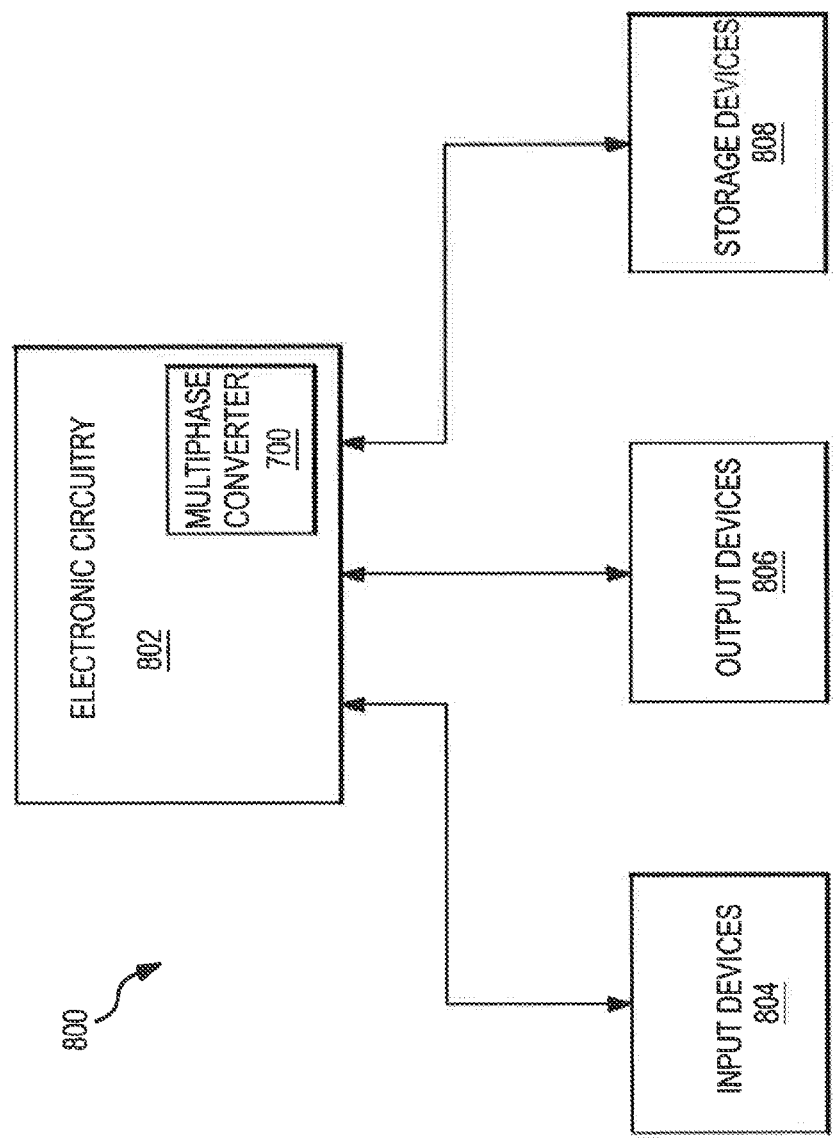
FIG. 8 is a functional block diagram of an electronic system including the multiphase converter of FIG. 7 according to one embodiment of the present invention.

FIG. 8 is a functional block diagram of an electronic system 800 including the multiphase regulator or converter 700 of FIG. 7 according to one embodiment of the present invention. Multiphase voltage converters or regulators according to embodiments of the present invention can be embodied as a variety of different types of electronic devices and systems, and thus the system 800 may be a computer, cellular telephone, personal digital assistant, or industrial system or device. More specifically, some applications of the regulator 700 include but are not limited to CPU power regulators, chip set regulators, point of load power regulators, and memory power regulators. FIG. 8 is a block diagram of an electronic system 800 including electronic circuitry 802 including the switching regulator 700 of FIG. 7. The electronic circuitry 802 includes circuitry for performing various functions required for the given system, such as executing specific software to perform specific calculations or tasks where the electronic system is a computer system. In addition, the electronic system 800 may include one or more input devices 804, such as a keyboard or a mouse or touchpad, coupled to the electronic circuitry 802 to allow an operator to interface with the system. Typically, the electronic system 800 also includes one or more output devices 806 coupled to the electronic circuitry 802, such output devices typically including a video display such as an LCD display. One or more data storage devices 808 are also typically coupled to the electronic circuitry 802 to store data or retrieve data from storage media (not shown). Examples of typical storage devices 808 include magnetic disk drives, tape cassettes, compact disk read-only (CD-ROMs) and compact disk read-write (CD-RW) memories, and digital video disks (DVDs), FLASH memory drives, and so on.

In one embodiment, a multiphase voltage regulator 700 provides auto phase-dropping and adding to optimize efficiency over a load range. In another embodiment, the internal control circuit 300 of FIG. 3 is part of a six-phase voltage regulator contained on a motherboard including a processor. The internal control circuit 300 detects peak current levels from the processor and controls the regulator to lower the number of activated phases when possible to thereby improve efficiency and reduce overall power consumption of the motherboard.

Even though various embodiments and advantages of the present invention have been set forth in the foregoing description, the above disclosure is illustrative only, and changes may be made in detail and yet remain within the broad principles of the present invention. Moreover, the functions performed by various components in the described embodiments may be combined to be performed by fewer elements, separated and performed by more elements, or combined into different functional blocks depending upon the specific embodiment of the present invention being utilized for a particular application. Therefore, the present invention is to be limited only by the appended claims.

What is claimed is:

1. A method of controlling the adding or dropping of phases in a multiphase voltage regulator, the regulator having an efficiency and the method comprising:
   calculating the efficiency of the regulator for a given number of phases being activated from an output voltage, input voltage, output current, and duty cycle of the regulator;
   calculating the efficiency of the regulator if a phase is added using a derivative of the duty cycle with respect to the output current;
   calculating the efficiency of the regulator if a phase is dropped using the derivative of the duty cycle; and
   from these operations of calculating, either adding a phase, dropping a phase, or maintaining the phase at a current value to thereby optimize the efficiency of the regulator.

2. The method of claim 1, wherein calculating the efficiency of the regulator if a phase is added using the derivative of the duty cycle with respect to the output current comprises:
   determining existing values for the output voltage, input voltage, output current, and duty cycle of the multiphase voltage regulator;
   calculating from these existing values an existing efficiency of the multiphase voltage regulator;
   determining a new lower duty cycle of the multiphase voltage regulator using the derivative of the duty cycle; and
   calculating a new efficiency of the multiphase voltage regulator at the new lower duty cycle.

3. The method of claim 2, wherein the method includes activating an additional phase of the multiphase voltage regulator when the new efficiency is greater than the existing efficiency.

4. The method of claim 2, wherein the method further includes performing the operations of determining and calculating for each possible combination of phases that is greater than the existing number of activated phases in order to calculate a new efficiency of the multiphase voltage regulator for each combination.

5. The method of claim 4, wherein the method further includes activating the number of phases in the multiphase voltage regulator corresponding to the combination of phases having the greatest efficiency.

6. The method of claim 1, wherein calculating the efficiency of the regulator if a phase is dropped using the derivative of the duty cycle with respect to the output current comprises:
   determining existing values for the output voltage, input voltage, output current, and duty cycle of the multiphase voltage regulator;
   calculating from these existing values an existing efficiency of the multiphase voltage regulator;
   determining a new higher duty cycle of the multiphase voltage regulator using the derivative of the duty cycle; and
   calculating a new efficiency of the multiphase voltage regulator at the new higher duty cycle.

7. The method of claim 6, wherein the method includes deactivating one phase of the multiphase voltage regulator when the new efficiency is greater than the existing efficiency.

8. The method of claim 6, wherein the method further includes performing the operations of determining and calculating for each possible combination of phases that is less than the existing number of activated phases in order to calculate a new efficiency of the multiphase voltage regulator for each combination.

9. The method of claim 8, wherein the method further includes deactivating the number of phases in the multiphase voltage regulator corresponding to the combination of phases having the greatest efficiency.

10. The method of claim 1, wherein the duty cycle is a linear function of the output current so that the derivative of the duty cycle has a constant value.

11. A multiphase voltage regulator, comprising:
    a plurality of voltage converter stages coupled in parallel, each voltage converter stage operable at a corresponding duty cycle responsive to control signals to generate an output voltage and output current from an input voltage and input current; and
    a control circuit operable to generate the control signals that are applied to the voltage converter stages and further operable to sense the output voltage, output current, input voltage, and duty cycle of the voltage converter stages, the control circuit operable to utilize a rate of change of the duty cycle as a function of the output current to control the number of active voltage converter stages.

12. The multiphase voltage regulator of claim 11,
    wherein the multiphase voltage regulator has an existing efficiency corresponding to the efficiency of the multiphase voltage regulator when operating at the current number of active voltage converter stages;
    wherein the control circuit is operable to utilize the rate of change of the duty cycle as a function of the output current to determine a first new efficiency of the regulator if the number of active voltage converter stages is increased;

wherein the control circuit is operable to utilize the rate of change of the duty cycle as a function of the output current to determine a second new efficiency of the regulator if the number of active voltage converter stages is decreased;

wherein the multiphase control circuit is further operable to increase the number of active voltage converter stages if the first new efficiency is greater than the existing efficiency; and wherein the multiphase control circuit is further operable to decrease the number of active voltage converter stages if the second new efficiency is greater than the existing efficiency.

13. The multiphase voltage regulator of claim 12, wherein the control circuit utilizes a constant rate of change of the duty cycle.

14. The multiphase voltage regulator of claim 13, wherein the control circuit is further operable to update over time the value of the constant rate of change of the duty cycle.

15. A multiphase voltage regulator, comprising:
an input node adapted to receive an input voltage and an input current;
an output node adapted to be coupled to a load and to supply an output voltage and overall output current to the load;
a plurality of voltage converter stages coupled in parallel between the input and output node, each voltage converter stage operable at a corresponding duty cycle responsive to control signals to utilize the input voltage and input current to provide on the output node the output voltage and a stage output current, the plurality of voltage converter stages supplying respective stage output currents that collectively correspond to the overall output current; and
a control circuit operable to generate the control signals that are applied to the voltage converter stages and further operable to sense the output voltage, output current, input voltage, and duty cycle of the voltage converter stages, the control circuit operable to calculate dynamic output current thresholds using the sensed duty cycle, and to compare these dynamic output current thresholds to the overall output current and control the number of active voltage converter stages responsive to these comparisons.

16. The multiphase voltage regulator of claim 15, wherein at least one of the voltage converter stages is a Buck converter.

17. A multiphase voltage regulator, comprising:
an input node adapted to receive an input voltage and an input current;
an output node adapted to be coupled to a load and to supply an output voltage and overall output current to the load;
a plurality of voltage converter stages coupled in parallel between the input and output node, each voltage converter stage operable at a corresponding duty cycle responsive to control signals to utilize the input voltage and input current to provide on the output node the output voltage and a stage output current, the plurality of voltage converter stages supplying respective stage output currents that collectively correspond to the overall output current;
a control circuit operable to generate the control signals that are applied to the voltage converter stages and further operable to sense the output voltage, output current, input voltage, and duty cycle of the voltage converter stages, the control circuit operable to calculate dynamic output current thresholds using the sensed duty cycle, and to compare these dynamic output current thresholds to the overall output current and control the number of active voltage converter stages responsive to these comparisons; and
wherein each dynamic output current threshold is designated $I_O$ and is calculated using the following equation:

$$I_o = \frac{P_{DR} \cdot N_{PH} \cdot (N_{PH} + 1)}{V_{IN} \cdot D_M - V_o}$$

where $N_{PH}$ indicates the current number of active phases of the multiphase regulator, $V_{IN}$ is the input voltage to the regulator, $D_M$ is the measured duty cycle of regulator, $V_O$ is the output voltage of the regulator, and $P_{DR}$ is a programmable variable, and wherein respective output current thresholds $I_O$ are calculated for values of $N_{PH}$ from $N_{PH}=1$ to $N_{PH}=N_{PHMAX}$, where $N_{PHMAX}$ equals the maximum number of phases minus one.

18. The multiphase voltage regulator of claim 17, wherein the control circuit is operable to increase the number of active voltage converter stages by one when the overall output current is initially below a corresponding output current threshold $I_{OT}$ and thereafter reaches a value equal to the value of the corresponding output current threshold.

19. The multiphase voltage regulator of claim 17, wherein the programmable variable PDR is fixed over a range of output current of the multiphase voltage regulator.

20. The multiphase voltage regulator of claim 18, wherein the control circuit is operable to decrease the number of active voltage converter stages by one when the overall output current is initially above a corresponding output current threshold $I_O$ and thereafter decreases to a value equal to the value of the corresponding output current threshold.

* * * * *